(12) United States Patent
Zhang (10) Patent No.: US 11,908,137 B2
(45) Date of Patent: Feb. 20, 2024

(54) METHOD, DEVICE AND EQUIPMENT FOR IDENTIFYING AND DETECTING MACULAR REGION IN FUNDUS IMAGE (71) Applicant: BEIJING ZHENHEALTH TECHNOLOGY CO., LTD., Beijing (CN)

(72) Inventor: Dongdong Zhang, Beijing (CN)

(73) Assignee: BEIJING ZHENHEALTH TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/010,804

(22) PCT Filed: Aug. 17, 2021

(86) PCT No.: PCT/CN2021/112998
§ 371 (c)(1),
(2) Date: Dec. 15, 2022

(87) PCT Pub. No.: WO2022/227342
PCT Pub. Date: Nov. 3, 2022

(65) Prior Publication Data
US 2023/0274419 A1    Aug. 31, 2023

(30) Foreign Application Priority Data
Apr. 30, 2021  (CN) .......................... 202110478090.5

(51) Int. Cl.
*G06T 7/00* (2017.01)
*G06T 7/90* (2017.01)
(Continued)

(52) U.S. Cl.
CPC .............. *G06T 7/0012* (2013.01); *G06T 5/40* (2013.01); *G06T 7/90* (2017.01); *G06V 10/22* (2022.01); *G06T 2207/30041* (2013.01)

(58) Field of Classification Search
None
See application file for complete search history.

(56) References Cited

U.S. PATENT DOCUMENTS

2011/0137157 A1  6/2011  Imamura et al.
2017/0296049 A1  10/2017  Uji et al.
(Continued)

FOREIGN PATENT DOCUMENTS

CN  106650596 A  5/2017
CN  109662686 A  4/2019
(Continued)

OTHER PUBLICATIONS

International Search Report, PCT/CN2021/112998, dated Jan. 30, 2022, 5 pages.

*Primary Examiner* — Samah A Beg (57) ABSTRACT

The present disclosure provides a method, device and equipment for identifying and detecting a macular region in a fundus image. The method includes the following steps: reading a current fundus image to be positioned and detected; detecting a macular region in the fundus image using a target detection model; when the macular region in the fundus image is not detected, detecting an optic disk region in the fundus image, and identifying and positioning the macular region based on the detected optic disk region; based on a positioning result of the macular region, extracting a macular image corresponding to the macular region from the fundus image; and performing multi-modal processing on the macular image, fusing images obtained by the multi-modal processing to obtain a fused image, and detecting whether the macular region is qualified or not according to the fused image.

6 Claims, 6 Drawing Sheets

(51) Int. Cl.
*G06V 10/22* (2022.01)
*G06T 5/40* (2006.01)

(56) References Cited

U.S. PATENT DOCUMENTS

| | | | |
|---|---|---|---|
| 2020/0000331 A1 | 1/2020 | Chakravorty et al. | |
| 2020/0260944 A1* | 8/2020 | Sun | G06T 7/0012 |
| 2022/0415087 A1* | 12/2022 | Li | G06V 10/98 |
| 2023/0154142 A1* | 5/2023 | Wang | G06V 10/44 |
| | | | 382/162 |

FOREIGN PATENT DOCUMENTS

| | | |
|---|---|---|
| CN | 109886955 A | 6/2019 |
| CN | 110751637 A | 2/2020 |
| CN | 111046717 A | 4/2020 |
| CN | 111951933 A | 11/2020 |
| CN | 112017187 A | 12/2020 |
| CN | 112991343 A | 6/2021 |
| IN | 110739071 A | 1/2020 |

\* cited by examiner

METHOD, DEVICE AND EQUIPMENT FOR IDENTIFYING AND DETECTING MACULAR REGION IN FUNDUS IMAGE

CROSS REFERENCE TO RELATED APPLICATION

This application claims priority to Chinese Patent Application No. 202110478090.5, filed with the China National Intellectual Property Administration (CNIPA) on Apr. 30, 2021 and entitled "METHOD, DEVICE AND EQUIPMENT FOR IDENTIFYING AND DETECTING MACULAR REGION IN FUNDUS IMAGE", which is incorporated herein by reference in its entirety.

TECHNICAL FIELD

The present disclosure relates to the technical field of medical image processing, and in particular, to a method, device and equipment for identifying and detecting a macular region in a fundus image.

BACKGROUND

Color fundus photography is one of the most important means to assist in fundus image detection and screening. As the most important part of the biological structure of the fundus, the macula directly affects people's vision. However, there have been fewer studies on the detection and classification methods of macular abnormalities at present. Usually, the detection and classification of the macular region mainly includes two technical modules, namely, a fundus macular region identification and positioning module and a macular region abnormality detection module. The macular region identification and positioning algorithm based on deep learning is relatively mature, which can position the macular region simply by labeling and learning the macular position in the fundus image. However, due to the rich and changeable image content of the macular region in the abnormal fundus image, the positioning of the macular region by the deep learning model trained only by limited fundus images is often inaccurate or even fails, which further affects the subsequent detection and classification results of the macular region, and finally leads to low accuracy in the positioning and detection results of the macular region in the fundus image.

SUMMARY

Based on this, an objective of the present disclosure is to provide a method, device and equipment for identifying and detecting a macular region in a fundus image, which can effectively improve the accuracy of identification and detection results of the macular region in the fundus image.

To achieve the above objective, the present disclosure provides a method for identifying and detecting a macular region in a fundus image, including:

reading a current fundus image to be positioned and detected;

detecting a macular region in the fundus image using a target detection model;

when the macular region in the fundus image is not detected, detecting an optic disk region in the fundus image, and identifying and positioning the macular region based on the detected optic disk region;

based on an identification and positioning result of the macular region, extracting a macular image corresponding to the macular region from the fundus image; and performing multi-modal processing on the macular image, fusing images obtained by the multi-modal processing to obtain a fused image, and detecting whether the macular region is qualified or not according to the fused image.

Optionally, the process of identifying and positioning the macular region based on the detected optic disk region may include:

obtaining a central coordinate of the optic disk region; and obtaining a central coordinate of the macular region according to the central coordinate of the optic disk region in combination with a multiple linear regression model.

Optionally, when the central coordinate of the macular region is obtained according to the central coordinate of the optic disk region in combination with the multiple linear regression model, based on a formula:

$$Y = WX + B,$$

the central coordinate of the macular region may be calculated, where Y is the central coordinate of the macular region, X is the central coordinate of the optic disk region, and both W and B are matrix parameters.

Optionally, the process of performing multi-modal processing on the macular image may include: performing at least one of contrast limited adaptive histogram equalization (CLAHE) processing, Gaussian filter enhancement processing, and hue saturation value (HSV) color space processing on the macular image.

Optionally, a process of detecting whether the macular region is qualified or not according to the fused image may include:

inputting the fused image into a pre-trained matching network, and detecting the fused image by the matching network, where the matching network may include a feature extraction network, a feature association network, a similarity measurement network, and an attention distribution network that are cascaded in sequence.

The present disclosure further provides a device for identifying and detecting a macular region in a fundus image, including an image reading module, a first macular region positioning module, a second macular region positioning module, a macular region extraction module, and a macular region detection module.

The image reading module is configured to read a current fundus image to be positioned and detected.

The first macular region positioning module is configured to detect a macular region in the fundus image using a target detection model.

The second macular region positioning module is configured to detect an optic disk region in the fundus image when the macular region in the fundus image is not detected by the first macular region positioning module, and identify and position the macular region based on the detected optic disk region.

The macular region extraction module is configured to extract a macular image corresponding to the macular region from the fundus image based on a positioning result of the macular region.

The macular region detection module is configured to perform multi-modal processing on the macular image, fuse images obtained by the multi-modal processing to obtain a fused image, and detect whether the macular region is qualified or not according to the fused image.

Optionally, the second macular region positioning module may include: a coordinate obtaining sub-module and a macular positioning sub-module.

The coordinate obtaining sub-module may be configured to obtain a central coordinate of the optic disk region.

The macular positioning sub-module may be configured to obtain a central coordinate of the macular region according to the central coordinate of the optic disk region in combination with a multiple linear regression model.

Optionally, when the macular positioning sub-module is configured to obtain the central coordinate of the macular region according to the central coordinate of the optic disk region in combination with the multiple linear regression model, based on a formula:

$$Y=WX+B,$$

the central coordinate of the macular region may be calculated, where Y is the central coordinate of the macular region, X is the central coordinate of the optic disk region, and both W and B are matrix parameters.

Optionally, the macular region detection module may include a multi-modal amplification sub-module.

The multi-modal amplification sub-module may be configured to perform multi-modal processing on the macular image, where the process of performing multi-modal processing on the macular image may include: performing at least one of CLAHE processing, Gaussian filter enhancement processing, and HSV color space processing on the macular image.

The present disclosure further provides equipment for identifying and detecting a macular region in a fundus image, including:

a processor; and a memory configured to store an instruction executable by the processor.

The processor is configured to implement the method for identifying and detecting a macular region in a fundus image according to any one of claims 1 to 5 when executing the executable instruction.

According to the specific embodiments provided by the present disclosure, the present disclosure discloses the following technical effects:

The present disclosure detects a macular region in the fundus image using a target detection model, detects an optic disk region in the fundus image when the macular region in the fundus image is not detected, and identifies and positions the macular region based on the detected optic disk region. Therefore, the macular region is identified and positioned by comprehensively considering a position relationship between the macular region and the optic disk region. Compared with a deep learning-based macular region positioning method which all depends on labeling of the macular region of the fundus, the method can achieve more accurate identification and positioning of the macular region in the fundus image. In addition, after the macular region is detected, a macular image corresponding to the macular region is extracted from the fundus image. Multi-modal processing is performed on the macular image, the images obtained by the multi-modal processing are fused to obtain a fused image, and whether the macular region is qualified or not is detected according to the fused image. By performing multi-modal fusion processing on the macular image, modeling can be performed based on a small sample size learning method, so as to achieve qualified and abnormal classification of the macular image, and greatly improve the identification ability of the macular image.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a method, device and equipment for identifying and detecting a macular region in a fundus image, which can effectively improve the accuracy of identification and detection results of the macular region in the fundus image.

To make the above-mentioned objective, features, and advantages of the present disclosure clearer and more comprehensible, the present disclosure will be further described in detail below in conjunction with the accompanying drawings and specific embodiments.

Figure 1:
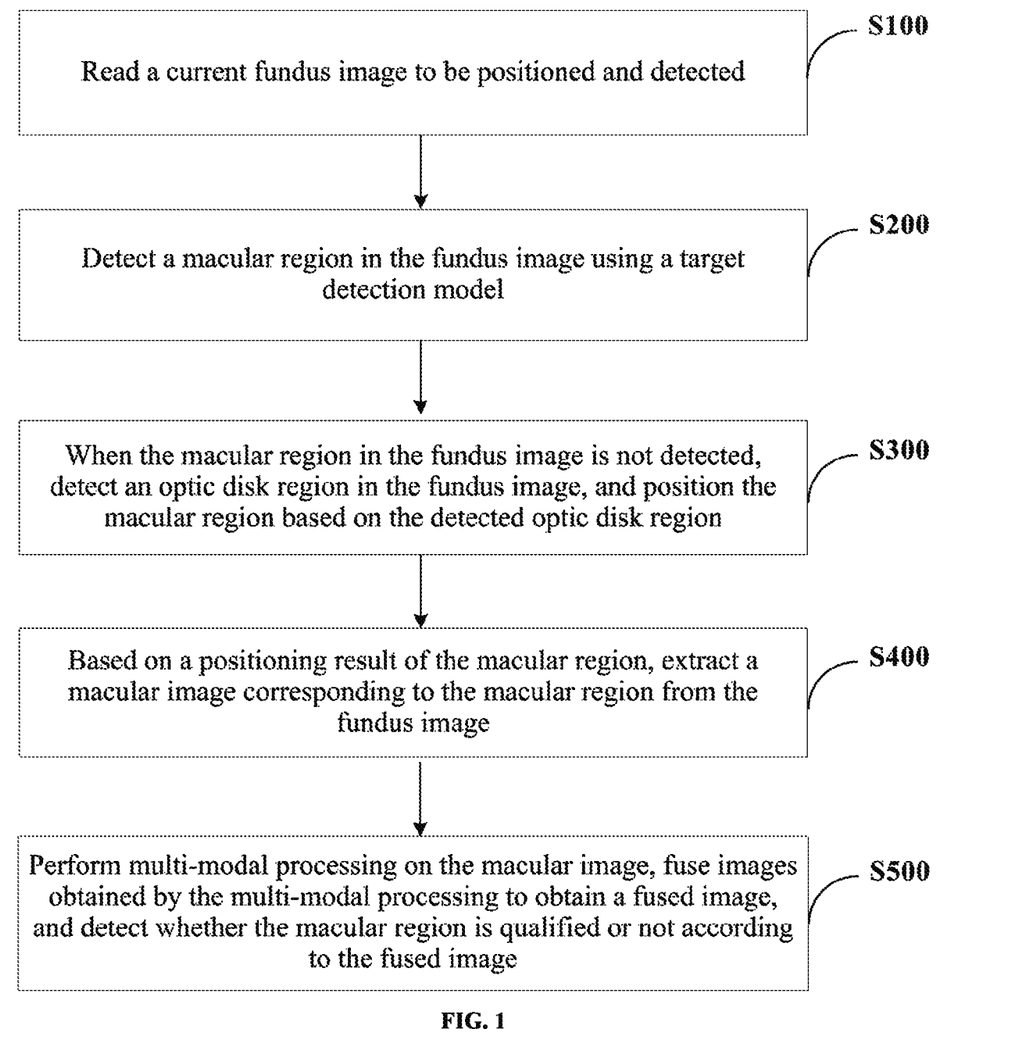
FIG. 1 is a flow chart of a method for identifying and detecting a macular region in a fundus image according to an embodiment of the present disclosure.

FIG. 1 is a flow chart of a method for identifying and detecting a macular region in a fundus image according to an embodiment of the present disclosure. As shown in FIG. 1, the method includes the following steps.

Step S100, a current fundus image to be positioned and detected is read.

Step S200, a macular region in the fundus image is detected using a target detection model. Here, it should be noted that the adopted target detection model may be the Faster Rcnn neural network.

Step S300, when the macular region in the fundus image is not detected, an optic disk region in the fundus image is detected, and the macular region is identified and positioned based on the detected optic disk region.

Step S400, based on an identification and positioning result of the macular region, a macular image corresponding to the macular region is extracted from the fundus image.

Step S500, multi-modal processing is performed on the macular image, the images obtained by the multi-modal processing are fused to obtain a fused image, and whether the macular region is qualified or not is detected according to the fused image.

Therefore, the method for identifying and detecting a macular region in a fundus image according to the embodiment of the present disclosure detects a macular region in the fundus image using a target detection model, detects an optic disk region in the fundus image when the macular region in the fundus image is not detected, and identifies and positions the macular region based on the detected optic disk region. Therefore, the macular region is identified and positioned by comprehensively considering a position relationship between the macular region and the optic disk region. Compared with a deep learning-based macular region positioning method which all depends on labeling of the macular region of the fundus, the method can achieve more accurate identification and positioning of the macular region in the fundus image. In addition, after the macular region is detected, a macular image corresponding to the macular region is extracted from the fundus image. Multi-modal processing is performed on the macular image, the images obtained by the multi-modal processing are fused to obtain a fused image, and whether the macular region is qualified or not is detected according to the fused image. By performing multi-modal fusion processing on the macular image, modeling can be performed based on a small sample size learning method, so as to achieve qualified and abnormal classification of the macular image, and greatly improve the identification ability of the macular image.

In a possible implementation, when the macular region is identified and positioned based on the detected optic disk region, a central coordinate of the optic disk region can be obtained, and a central coordinate of the macular region can be obtained according to the central coordinate of the optic disk region in combination with a multiple linear regression model.

Specifically, when the central coordinate of the macular region is obtained according to the central coordinate of the optic disk region in combination with the multiple linear regression model, based on a formula:

$Y=WX+B$, the central coordinate of the macular region is calculated, where Y is the central coordinate of the macular region, X is the central coordinate of the optic disk region, and both W and B are matrix parameters. Here, it should be noted that W and B can be determined by the least square method.

That is, when W and B are determined by the least square method, the following matrix solving formula can be used:

$$[w, B] = (X_0^T X_0)^{-1} X_0^T Y_1$$

$$X_0 = \begin{bmatrix} X \\ 1 \end{bmatrix}_1.$$

It can be known from the foregoing that both W and B are matrix parameters, Y is the central coordinate of the macular region, and X is the central coordinate of the optic disk region. $X_0$ is a matrix vector, consisting of a matrix vector X and a vector 1.

In addition, it should also be noted that when the central coordinate of the macular region is determined using the multiple linear regression model in the above manner, different multiple linear regression models can also be constructed for the left eye and the right eye respectively, such that the center coordinate of the macular region is determined using the corresponding multiple linear regression model based on the attribute whether the current fundus image to be processed is the left eye or the right eye.

In addition, it should also be pointed out that according to the foregoing, in the method of the embodiment of the present disclosure, the target detection model is used when the macular region and the optic disk region in the fundus image are detected. Therefore, before identifying and positioning the macular region and the optic disk region in the fundus image to be identified and detected, it is also necessary to train the target detection model to make the used target detection model converge.

That is, the collected sample data (i.e., fundus image data) is labeled. The labeled content includes positions of the macular region and the optic disk region in the fundus image (which can be labeled with rectangular frames) and the central coordinates of the macular region and the optic disk region (which can be labeled with coordinate points).

Then, the labeled sample data is input into the target detection model (Faster Rcnn) in sequence, and the target detection model is trained so that it can detect and position the macular region and the optic disk region in the fundus image.

Figure 2:
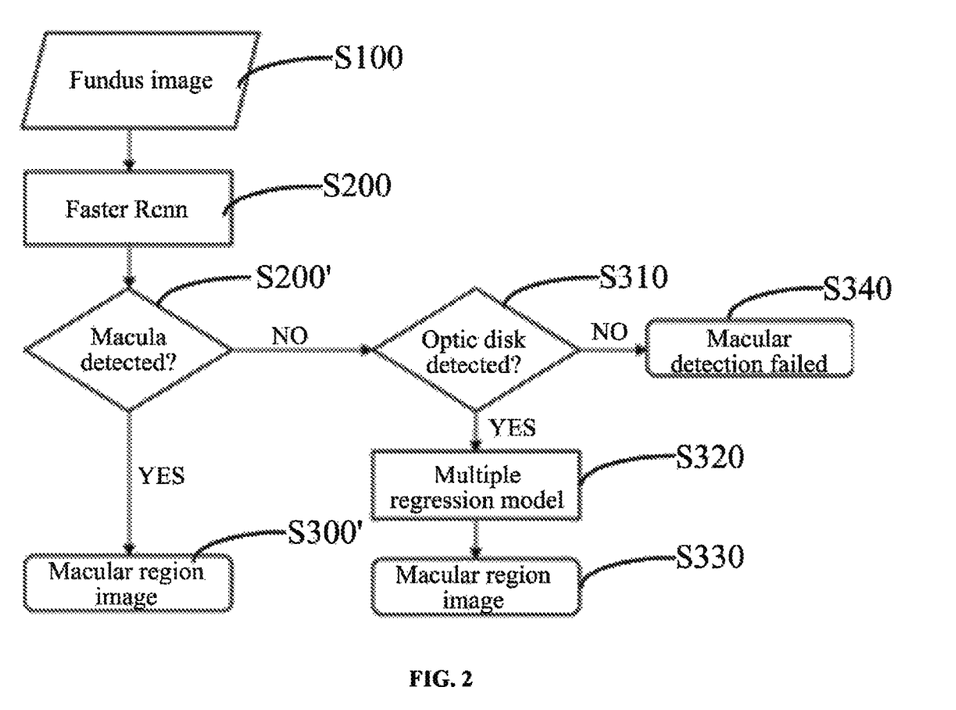
FIG. 2 is a flow chart of positioning the macular region in the method for identifying and detecting a macular region in a fundus image according to the embodiment of the present disclosure.

Referring to FIG. 2, when the macular region in the fundus image to be positioned and detected is positioned, firstly, through step S200, the macular region in the fundus image is detected using the pre-trained target detection model. In addition, step S200' is performed to determine whether the macular region is detected or not. If the macular region is directly detected, through step S300', the position of the macular region in the fundus image is directly positioned. If the macular region is not detected, step S310 is performed to detect the optic disk region in the fundus image using the trained target detection model, and determine whether the optic disk region is detected or not. If the optic disk region is also not detected, it indicates that there is a problem in the fundus image, and it is not suitable for the identification and classification of the macular region. At this time, through step S340, a prompt of detection failure is issued, and the next fundus image is directly read for positioning and detection of the macular region. If the optic disk region is detected, through step S320, the central coordinate of the optic disk region is obtained, and the central coordinate of the macular region is calculated and determined according to the positioned central coordinate of the optic disk region using the multiple linear regression model. In this way, after the central coordinate of the macular region is positioned, through step S330, the macular region is identified and positioned by using a frame body such as a rectangular frame or a circular frame with a preset corresponding size and taking the positioned central coordinate of the macular region as the center.

In a possible implementation, after the central coordinate of the macular region is positioned according to the central coordinate of the optic disk region, when the macular region is identified and positioned using a frame body such as a rectangular frame or a circular frame with a preset size, the macular region can be positioned using the size of the positioned optic disk region.

When the macular region can be positioned using the size of the positioned optic disk region, the macular region can be cropped by 1 to 1.5 times the size of the positioned optic disk region taking the determined central coordinate of the macular region as the center. For example: the macular region can be cropped by 1.5 times the size of the positioned optic disk region.

After the macular region in the fundus image is positioned in the above manner, the macular region can be cut out from the fundus image and output, thereby extracting the macular image corresponding to the macular region.

Further, after the macular image is obtained by any of the above methods, whether the macular region is qualified or not can be detected based on the obtained macular image. Here, it can be understood by those skilled in the art that the detection of whether the macular region is qualified or not refers to the detection of whether the positioned macular region is normal and whether there is any abnormality.

According to the foregoing, in the method of the embodiment of the present disclosure, before the detection of whether the macular region is qualified or not, the method further includes an operation of performing multi-modal processing on the macular image and fusing the images obtained by the multi-modal processing to obtain a fused image.

In a possible implementation, the process of performing multi-modal processing on the macular image includes: performing at least one of CLAHE processing, Gaussian filter enhancement processing, and HSV color space processing on the macular image. Preferably, referring to FIG. 3, the multi-modal processing on the macular image includes: CLAHE processing, Gaussian filter enhancement processing, and HSV color space processing.

Figure 3:
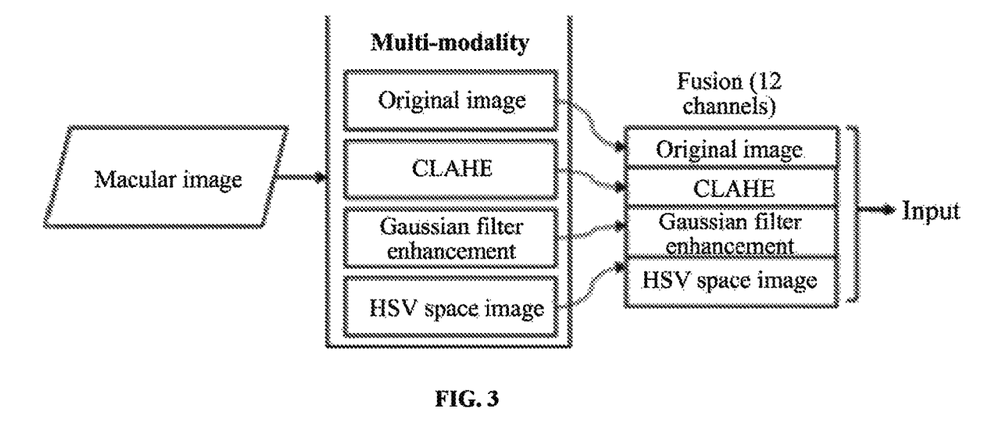
FIG. 3 is a flow chart of performing multi-modal processing on the macular image during macular region detection in the method for identifying and detecting a macular region in a fundus image according to the embodiment of the present disclosure.

That is, a multi-modal amplification module is constructed. The multi-modal amplification sub-module includes a CLAHE processing unit, a Gaussian filter enhancement processing unit, and an HSV color space processing unit. The macular image is processed by the CLAHE processing unit, the Gaussian filter enhancement processing unit, and the HSV color space processing unit to obtain a CLAHE image, a Gaussian filter enhancement image, and an HSV color space image.

Then, a fusion unit in the multi-modal amplification module fuses images of four modalities, an original image (i.e., the extracted macular image by cropping), the CLAHE image, the Gaussian filter enhancement image, and the HSV color space image, to obtain the fused image as an input image. Then, the obtained fused image is input into a pre-trained matching network, and the fused image is detected by the matching network to finally obtain a detection result of qualified or abnormal macular image.

When the images in the four modalities are fused, the fusion can be performed by image channel superposition. That is, the images of four modalities, the original image (i.e., the extracted macular image by cropping), the CLAHE image, the Gaussian filter enhancement image, and the HSV color space image, each have 3 channels. The data of 12 channels can be obtained as the input of the matching network by the image channel superposition.

Here, it should be pointed out that when the obtained fused image is input into the matching network to detect whether the macular region is qualified or not, the matching network also needs to be pre-trained to converge.

Figure 4:
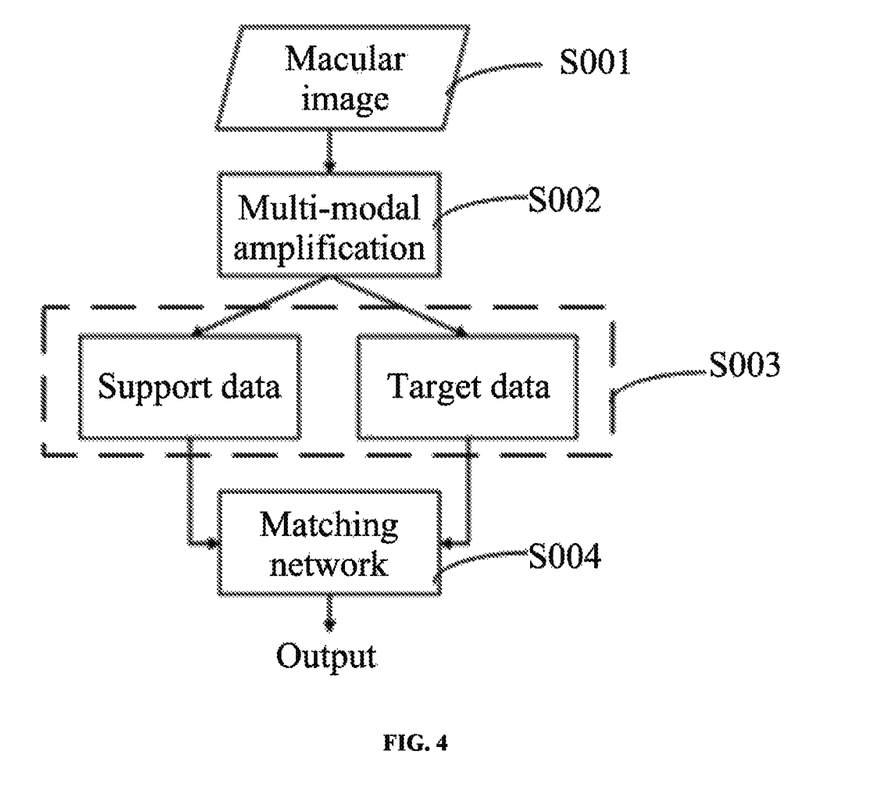
FIG. 4 is a flow chart of detecting the macular region in the method for identifying and detecting a macular region in a fundus image according to the embodiment of the present disclosure.

Referring to FIG. 4, the training of the matching network specifically includes: step S001, a macular image data set is constructed, including qualified macular images (i.e., normal macular images) and abnormal macular images (macular degeneration images such as: epimacular membrane, macular hole, age-related macular degeneration (AMD), central serous chorioretinopathy (CSCR), and central exudative chorioretinopathy).

Then through step S002, the multi-modal amplification module is constructed. The images of four modalities, the original image, the CLAHE image, the Gaussian filter enhancement image, and the HSV color space image, are fused as the input image for model training.

Then, step S003 is performed to divide the multi-modal fused image into a support data set and a target data set, and through step S004, the support data set and the target data set are input into the matching network in sequence for training learning and testing application.

Figure 5:
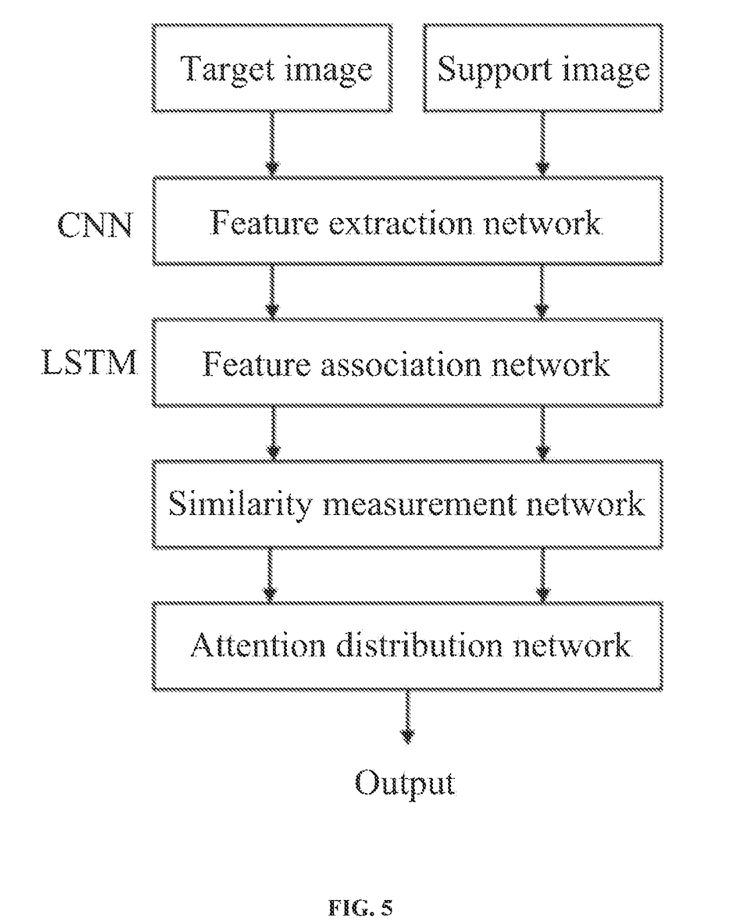
FIG. 5 is a schematic diagram of a network structure of a matching network used in the method for identifying and detecting a macular region in a fundus image according to the embodiment of the present disclosure when whether the macular region is qualified or not is detected.

Further, referring to FIG. 5, in the method of the embodiment of the present disclosure, the network structure of the designed and adopted matching network may include a feature extraction network, a feature association network, a similarity measurement network, and an attention distribution network that are cascaded in sequence. The feature extraction network can perform feature extraction on the support image and the target image using a convolutional neural network (for example: ResNet50 can be used). The feature association network analyzes internal and external correlations between the support image and the target image using a recurrent neural network (for example: a 16-layer long short-term memory (LSTM) unit network can be used). The similarity measurement module is not trained in the network (for example: cosine similarity can be used for measurement). The attention distribution network is used to improve the training efficiency and performance of the model (for example: the softmax function can be used for attention distribution).

The network is used to learn the similarity between the target image and the support image, so as to classify the target image by using a small number of samples.

By inputting the fused image obtained by multi-modal fusion into the trained matching network, the matching network performs feature extraction, feature association, similarity measurement, and attention allocation on the fused image in sequence to obtain the final classification result.

Correspondingly, based on any one of the above methods for identifying and detecting a macular region in a fundus image, the present disclosure further provides a device for identifying and detecting a macular region in a fundus image. Since the working principle of the device for identifying and detecting a macular region in a fundus image provided by the present disclosure is the same as or similar to the principle of the method for identifying and detecting a macular region in a fundus image provided by the present disclosure, the repetition will not be repeated.

Figure 6:
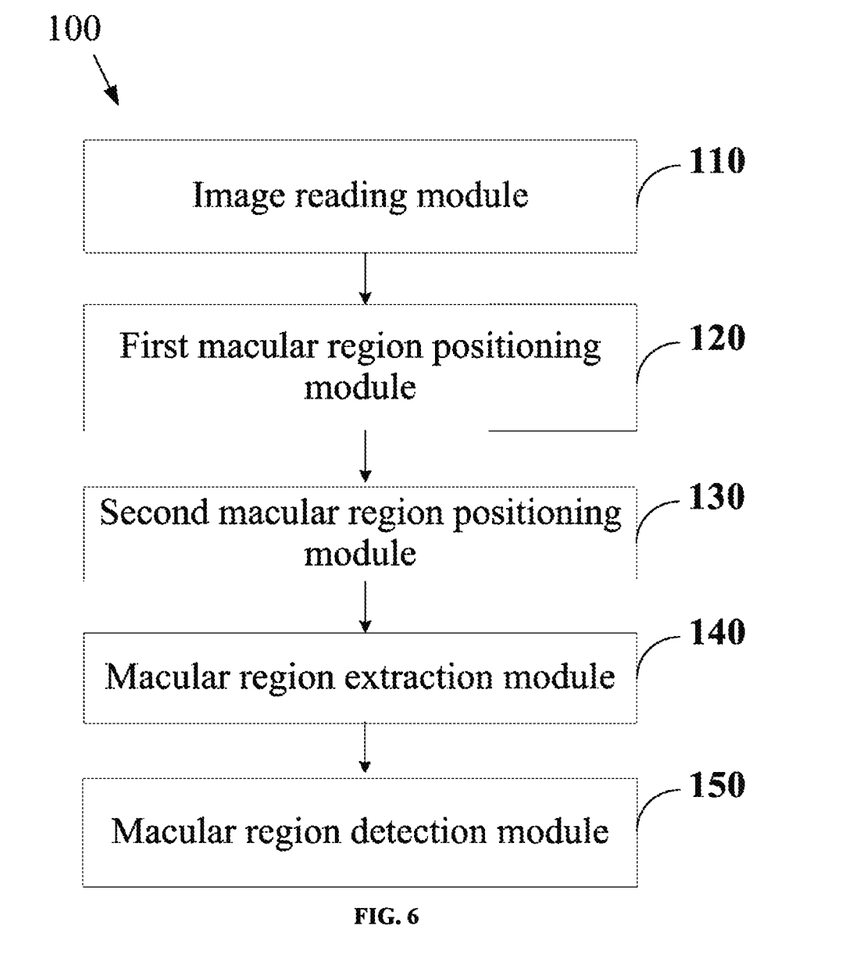
FIG. 6 is a structural block diagram of a device for identifying and detecting a macular region in a fundus image according to the embodiment of the present disclosure.

Referring to FIG. 6, the device for identifying and detecting a macular region in a fundus image 100 provided by the present disclosure includes an image reading module 110, a first macular region positioning module 120, a second macular region positioning module 130, a macular region extraction module 140, and a macular region detection module 150. The image reading module 110 is configured to read a current fundus image to be positioned and detected. The first macular region positioning module is configured to detect a macular region in the fundus image using a target detection model 120. The second macular region positioning module 130 is configured to detect an optic disk region in the fundus image when the macular region in the fundus image is not detected by the first macular region positioning module 120, and identify and position the macular region based on the detected optic disk region. The macular region extraction module 140 is configured to extract a macular image corresponding to the macular region from the fundus image based on a positioning result of the macular region. The macular region detection module 150 is configured to perform multi-modal processing on the macular image, fuse the image obtained by the multi-modal processing to obtain a fused image, and detect whether the macular region is qualified or not according to the fused image.

In a possible implementation, the second macular region positioning module 130 includes: a coordinate obtaining sub-module and a macular positioning sub-module (hidden in the figure). The coordinate obtaining sub-module is configured to obtain a central coordinate of the optic disk region. The macular positioning sub-module is configured to obtain a central coordinate of the macular region according to the central coordinate of the optic disk region in combination with a multiple linear regression model.

In a possible implementation, when the macular positioning sub-module is configured to obtain the central coordinate of the macular region according to the central coordinate of the optic disk region in combination with the multiple linear regression model, based on a formula:

$$Y=WX+B,$$

the central coordinate of the macular region is calculated, where Y is the central coordinate of the macular region, X is the central coordinate of the optic disk region, and both W and B are matrix parameters.

In a possible implementation, the macular region detection module 150 includes a multi-modal amplification sub-module (hidden in the figure). The multi-modal amplification sub-module is configured to perform multi-modal processing on the macular image. The process of performing multi-modal processing on the macular image includes: performing at least one of CLAHE processing, Gaussian filter enhancement processing, and HSV color space processing on the macular image.

Further, in the device for identifying and detecting a macular region in a fundus image 100 according to the embodiment of the present disclosure, the macular region detection module 150 further includes a detection sub-module (hidden in the figure). Here, it should be pointed out that the detection sub-module can be realized by the designed neural network for image detection and identification.

Specifically, referring to FIG. 5, the neural network (i.e., the matching network) includes a feature extraction network, a feature association network, a similarity measurement network, and an attention distribution network that are cascaded in sequence. The network is used to learn the similarity between the target image and the support image, so as to classify and detect the target image by using a small number of samples.

Furthermore, according to another aspect of the present disclosure, equipment for identifying and detecting a macular region in a fundus image 200 is further provided.

Figure 7:
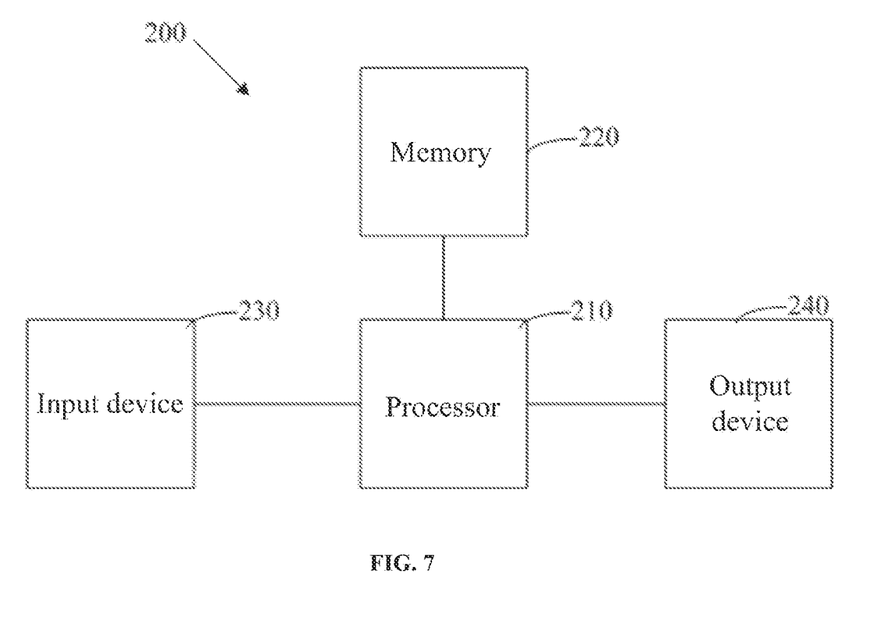
FIG. 7 is a structural block diagram of equipment for identifying and detecting a macular region in a fundus image according to the embodiment of the present disclosure.

Referring to FIG. 7, the equipment for identifying and detecting a macular region in a fundus image 200 according to the embodiment of the present disclosure includes a processor 210 and a memory 220 configured to store an instruction executable by the processor 210. The processor 210 is configured to implement any one of the above methods for identifying and detecting a macular region in a fundus image when executing the executable instruction.

Here, it should be pointed out that there may be one or more processors 210. In addition, the equipment for identifying and detecting a macular region in a fundus image 200 according to the embodiment of the present disclosure may further include an input device 230 and an output device 240. The processor 210, the memory 220, the input device 230, and the output device 240 may be connected through a bus or may be connected in other ways, which is not specifically limited herein.

As a computer-readable storage medium, the memory 220 can be used to store software programs, computer-executable programs, and various modules, such as programs or modules corresponding to the method for identifying and detecting a macular region in a fundus image according to the embodiment of the present disclosure. The processor 210 executes various functional applications and data processing of the equipment for identifying and detecting a macular region in a fundus image 200 by running a software program or module stored in the memory 220.

The input device 230 can be used to receive an input digital or signal. The signal may be a key signal related to user settings and function control of the apparatus/terminal/server. The output device 240 may include a display device such as a display screen.

Each embodiment of this specification is described in a progressive manner, each embodiment focuses on the difference from other embodiments, and the same and similar parts between the embodiments may refer to each other.

In this specification, specific examples are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and the scope of application in accordance with the ideas of the present disclosure. In conclusion, the content of the present description shall not be construed as limitations to the present disclosure.

What is claimed is:

1. A method for identifying and detecting a macular region in a fundus image, comprising:
   reading a current fundus image to be positioned and detected;
   detecting a macular region in the fundus image using a target detection model;
   when the macular region in the fundus image is not detected, detecting an optic disk region in the fundus image, and identifying and positioning the macular region based on the detected optic disk region;
   based on an identification and positioning result of the macular region, extracting a macular image corresponding to the macular region from the fundus image; and
   performing multi-modal processing on the macular image, and fusing images obtained by the multi-modal processing to obtain a fused image, wherein
   the process of identifying and positioning the macular region based on the detected optic disk region comprises:

obtaining a central coordinate of the optic disk region; and obtaining a central coordinate of the macular region according to the central coordinate of the optic disk region in combination with a multiple linear regression model, wherein when the central coordinate of the macular region is obtained according to the central coordinate of the optic disk region in combination with the multiple linear regression model, based on a formula:

$$Y=WX+B,$$

the central coordinate of the macular region is calculated, wherein Y is the central coordinate of the macular region, X is the central coordinate of the optic disk region, and both W and B are matrix parameters;

W and B are determined by a least square method;

and the following matrix solving formula is used when W and B are determined by the least square method:

$$[w, B] = (X_0^T X_0)^{-1} X_0^T Y_1$$

$$X_0 = \begin{bmatrix} X \\ 1 \end{bmatrix}_1,$$

wherein $X_0$ is a matrix vector, consisting of a matrix vector X and a vector 1; and the images obtained by the multi-modal processing are fused by image channel superposition to obtain the fused image.

2. The method according to claim 1, wherein the process of performing multi-modal processing on the macular image comprises: performing at least one of contrast limited adaptive histogram equalization (CLARE) processing, Gaussian filter enhancement processing, and hue saturation value (HSV) color space processing on the macular image.

3. A device for identifying and detecting a macular region in a fundus image, comprising an image reading module, a first macular region positioning module, a second macular region positioning module, a macular region extraction module, and a macular region detection module, wherein the image reading module is configured to read a current fundus image to be positioned and detected;

the first macular region positioning module is configured to detect a macular region in the fundus image using a target detection model;

the second macular region positioning module is configured to detect an optic disk region in the fundus image when the macular region in the fundus image is not detected by the first macular region positioning module, and identify and position the macular region based on the detected optic disk region;

the macular region extraction module is configured to extract a macular image corresponding to the macular region from the fundus image based on a positioning result of the macular region; and the macular region detection module is configured to perform multi-modal processing on the macular image, fuse images obtained by the multi-modal processing to obtain a fused image, and detect whether the macular region is qualified or not according to the fused image, wherein the second macular region positioning module comprises: a coordinate obtaining sub-module and a macular positioning sub-module;

the coordinate obtaining sub-module is configured to obtain a central coordinate of the optic disk region; and the macular positioning sub-module is configured to obtain a central coordinate of the macular region according to the central coordinate of the optic disk region in combination with a multiple linear regression model, wherein when the macular positioning sub-module is configured to obtain the central coordinate of the macular region according to the central coordinate of the optic disk region in combination with the multiple linear regression model, based on a formula:

$$Y=WX+B,$$

the central coordinate of the macular region is calculated, wherein Y is the central coordinate of the macular region, X is the central coordinate of the optic disk region, and both W and B are matrix parameters;

W and B are determined by a least square method;

and the following matrix solving formula is used when W and B are determined by the least square method:

$$[w, B] = (X_0^T X_0)^{-1} X_0^T Y_1$$

$$X_0 = \begin{bmatrix} X \\ 1 \end{bmatrix}_1,$$

wherein $X_0$ is a matrix vector, consisting of a matrix vector X and a vector 1; and the macular region detection module is configured to fuse the images obtained by the multi-modal processing by image channel superposition to obtain the fused image.

4. The device according to claim 3, wherein the macular region detection module comprises a multi-modal amplification sub-module;

and the multi-modal amplification sub-module is configured to perform multi-modal processing on the macular image, wherein the process of performing multi-modal processing on the macular image comprises: performing at least one of CLAHE processing, Gaussian filter enhancement processing, and HSV color space processing on the macular image.

5. Equipment for identifying and detecting a macular region in a fundus image, comprising:

a processor; and a memory configured to store an instruction executable by the processor, wherein the processor is configured to implement the method according to claim 1 when executing the executable instruction.

6. The equipment for identifying and detecting a macular region in a fundus image according to claim 5, wherein the process of performing multi-modal processing on the macular image comprises: performing at least one of contrast limited adaptive histogram equalization (CLAHE) processing, Gaussian filter enhancement processing, and hue saturation value (HSV) color space processing on the macular image.

* * * * *